US011374849B1

(12) United States Patent
Bajaj et al.

(10) Patent No.: US 11,374,849 B1
(45) Date of Patent: Jun. 28, 2022

(54) HIGH AVAILABILITY ROUTER SWITCHOVER DECISION USING MONITORING AND POLICIES

(71) Applicant: Versa Networks, Inc., San Jose, CA (US)

(72) Inventors: Kapil Bajaj, Fremont, CA (US); Apurva Mehta, Cupertino, CA (US)

(73) Assignee: Versa Networks, Inc., San Jose, CA (US)

( * ) Notice: Subject to any disclaimer, the term of this patent is extended or adjusted under 35 U.S.C. 154(b) by 0 days.

(21) Appl. No.: 17/127,946

(22) Filed: Dec. 18, 2020

(51) Int. Cl.
*H04L 45/02* (2022.01)
*H04L 43/10* (2022.01)
*H04L 45/44* (2022.01)
*H04L 45/00* (2022.01)

(52) U.S. Cl.
CPC .............. *H04L 45/02* (2013.01); *H04L 43/10* (2013.01); *H04L 45/22* (2013.01); *H04L 45/44* (2013.01)

(58) Field of Classification Search
CPC ......... H04L 45/02; H04L 43/10; H04L 45/22; H04L 45/44
See application file for complete search history.

(56) References Cited

U.S. PATENT DOCUMENTS

| | | | | |
|---|---|---|---|---|
| 6,505,244 B1 * | 1/2003 | Natarajan | ............. | H04L 47/765 709/224 |
| 6,584,502 B1 * | 6/2003 | Natarajan | ........... | H04L 41/0233 709/224 |
| 6,973,034 B1 * | 12/2005 | Natarajan | .......... | A63B 53/0466 370/235 |
| 8,886,834 B2 * | 11/2014 | Singh | .................. | H04L 41/0663 709/245 |
| 9,985,875 B1 * | 5/2018 | Srinath | .................... | H04L 45/28 |
| 10,250,562 B1 * | 4/2019 | Srinath | .................... | H04L 69/40 |
| 10,558,767 B1 * | 2/2020 | Natarajan | .......... | H03H 17/0257 |
| 2005/0249113 A1 * | 11/2005 | Kobayashi | ............ | H04L 45/586 370/219 |
| 2006/0155828 A1 * | 7/2006 | Ikeda | ..................... | H04L 45/586 709/220 |
| 2007/0153765 A1 * | 7/2007 | Lei | ......................... | H04L 45/586 370/351 |
| 2009/0073989 A1 * | 3/2009 | Cai | ......................... | H04L 45/66 370/395.53 |
| 2009/0129398 A1 * | 5/2009 | Riegel | ................... | H04L 45/583 370/401 |
| 2009/0285090 A1 * | 11/2009 | Allasia | .................... | H04L 45/00 370/221 |
| 2009/0303990 A1 * | 12/2009 | Ambrose | ................ | H04L 45/60 370/389 |
| 2015/0381407 A1 * | 12/2015 | Wang | ................... | H04L 41/0663 370/221 |

(Continued)

*Primary Examiner* — Jimmy H Tran
(74) *Attorney, Agent, or Firm* — Loza & Loza, LLP

(57) ABSTRACT

High availability router switchover decision are described using monitoring and policies. In one example, available network routing parameters are monitored. A change of one of the network routing parameters is detected. A parameter matrix of network routing parameters is updated in response to the detected change. The changed network routing parameters are applied to a policy in response to updating the parameter matrix and a switchover request is sent to a standby network node when the policy is mite by the changed network routing parameter.

20 Claims, 8 Drawing Sheets

(56) References Cited

U.S. PATENT DOCUMENTS

| | | | |
|---|---|---|---|
| 2016/0028616 A1* | 1/2016 | Vasseur | H04L 47/50 370/412 |
| 2016/0080249 A1* | 3/2016 | Lu | H04L 45/28 370/219 |
| 2018/0212819 A1* | 7/2018 | Zhang | H04L 41/0686 |
| 2018/0352036 A1* | 12/2018 | Baid | H04L 41/0668 |
| 2019/0196922 A1* | 6/2019 | Cho | G06F 3/0622 |
| 2020/0045087 A1* | 2/2020 | Srinath | H04L 41/0668 |
| 2021/0044476 A1* | 2/2021 | Zilbershtein | H04L 43/0829 |
| 2021/0152493 A1* | 5/2021 | Song | H04L 49/3045 |
| 2022/0060408 A1* | 2/2022 | Manickam | H04L 45/308 |

* cited by examiner

HIGH AVAILABILITY ROUTER SWITCHOVER DECISION USING MONITORING AND POLICIES

TECHNICAL FIELD

The embodiments herein relate to data communications through networks and switching traffic over to a different node in the event of a network failure.

BACKGROUND

Network data communications have moved beyond asynchronous text and file transfer traffic to time-sensitive traffic such as streaming and interactive communications. At the same time many of the resources being used to carry the data are virtualized. A VNF (Virtual Network Function) may take the place of a hardware router. A VRRP (Virtual Router Redundancy Protocol) is used to assign routes through virtual routers denoting some virtual routers as masters and others as backups.

High Availability (HA) techniques are intended to provide uninterrupted internet data communications service in the event of failures. HA attempts to compensate for the design of the Internet to provide reliability similar to that provided by telephony service at the lower cost of the Internet. In HA techniques, the states of an active node of a wide area network (WAN) or metropolitan area network (MAN) are replicated on a standby node that is coupled to the same network in order to provide a seamless switchover to the standby node in the event of a failure at the active node. A switchover from the active node to a standby node is made based on the health of the processes running on the active node or based on a failure of network interfaces coupled to the active node. After the switchover, the active node becomes a standby node and the standby node takes the place of the active node, becoming active and maintaining the state of the active node. The new active node carries the data communications traffic instead of the original active node.

SUMMARY

High availability router switchover decisions are described using monitoring and policies. In one example, available network routing parameters are monitored. A change of one of the network routing parameters is detected. A parameter matrix of network routing parameters is updated in response to the detected change. The changed network routing parameters are applied to a policy in response to updating the parameter matrix and a switchover request is sent to a standby network node when the policy is mite by the changed network routing parameter.

Some embodiments include generating an interrupt at a system monitor of the active node and sending the interrupt to a high availability module of the active node when the change in a network routing parameter is detected and wherein applying the changed network routing parameter to the policy is performed by the high availability module.

Some embodiments include applying network routing parameters of the standby network node to a policy at the network standby node and sending a switchover request acknowledgment to the active network node from the standby network node when the standby network node policy is not met by the standby network node network routing parameters.

Some embodiments include sending a portion of the parameter matrix as a capability matrix to the standby network node for comparison with a capability matrix of the standby node. In some embodiments, the switchover request is rejected by the standby network node based on the comparison. In some embodiments, the comparison includes comparing network capabilities of the active network node to the capabilities of the standby network node.

In some embodiments, applying comprises applying a count of the changed network routing parameter to a rule with a comparison operator to determine if the comparison is met. In some embodiments, applying comprises applying a plurality of counts of the parameter matrix to a sequence of rules having comparison operators. In some embodiments, the rules of the sequence are conditional upon meeting a preceding rule of the sequence.

In some embodiments, the plurality of network routing parameters comprises a status of the active network node as a VRRP (Virtual Router Redundancy Protocol) master or backup node and wherein detecting a change comprises detecting when the status of the active network node changes. In some embodiments, the plurality of network routing parameters comprises availability of a connected routing peer. In some embodiments, monitoring the availability of the connected routing peer comprises sending a ping to the connected routing peer. In some embodiments, the connected routing peer comprises a next hop border gateway protocol neighbor router.

In another example, a non-transitory computer-readable storage medium containing program instructions, wherein execution of the program instructions by the computer causes the computer to perform operations comprising monitoring a plurality of network routing parameters that are available to an active network node, detecting a change of one of the plurality of network routing parameters, updating a parameter matrix of network routing parameters in response to the detected change, applying the changed network routing parameter to a policy in response to updating the parameter matrix, and sending a switchover request to a standby network node when the policy is met by the changed network routing parameter.

In some embodiments, applying comprises applying a count of the changed network routing parameter to a rule with a comparison operator to determine if the comparison is met. In some embodiments, applying comprises applying a plurality of counts of the parameter matrix to a sequence of rules having comparison operators.

In another example, an active network node includes a system monitor configured to monitor a plurality of network routing parameters that are available to the active network node and to detect a change of one of the plurality of network routing parameters, and a high availability module configured to update a parameter matrix of network routing parameters in response to the detected change, to apply the changed network routing parameter to a policy in response to updating the parameter matrix, and to send a switchover request to a standby network node when the policy is met by the changed network routing parameter.

In some embodiments, the system monitor further generates an interrupt and sends the interrupt to the high availability module when the change in a network routing parameter is detected. In some embodiments, the high availability node further sends a portion of the parameter matrix as a capability matrix to the standby network node for comparison with a capability matrix of the standby node.

BRIEF DESCRIPTION OF THE FIGURES

The embodiments herein will be better understood from the following detailed description with reference to the drawings, in which.

DETAILED DESCRIPTION OF EMBODIMENTS

Figure 1:
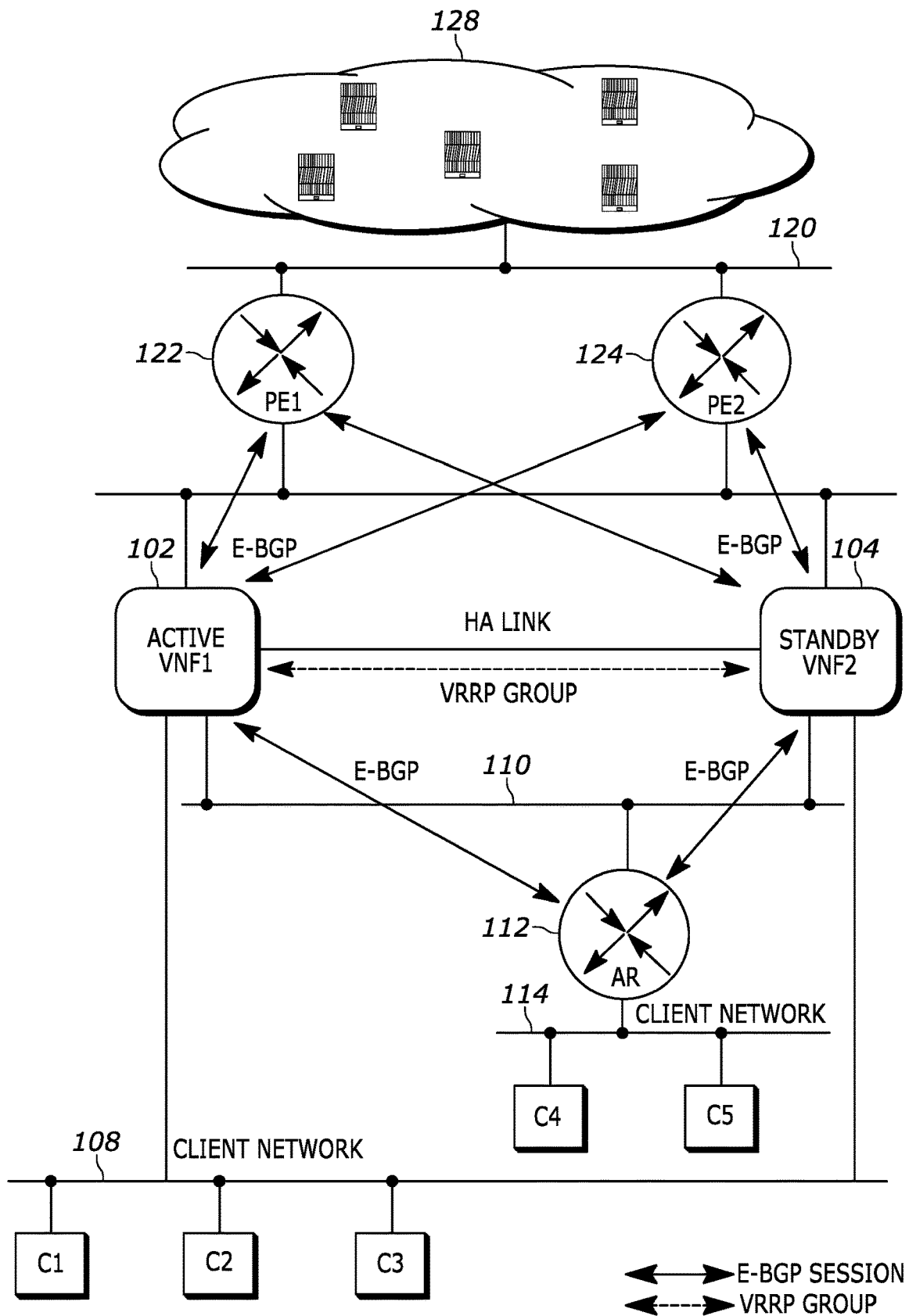
FIG. 1 is a block diagram of a network suitable for use with the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein are described in the context of a Software Defined Wide Area Network (SD-WAN or SDWAN) where there is at least one designated hub node for each of the branch nodes and each hub node potentially acting as a gateway to a plurality of branch nodes. Further, branch nodes themselves may have direct access to the Internet through one or more WAN links. However, embodiments disclosed herein can be applied in non-software-defined WANs and for applications hosted within the network, e.g., within a LAN (Local Area Network).

As described herein, a High Availability (HA) system tracks multiple circumstances regarding the data communications traffic through the network. These circumstances include the health of the running processes on the active node, the VRRP (Virtual Router Redundancy Protocol) state, and the availability of other resources that may be used to send or receive traffic. The availabilities may include the availability of network interfaces, the availability of connected routing peers, for example BGP (Border Gateway Protocol) neighbor peers, the availability of routes, and the availability of remote hosts. A missing route can lead to brownouts of an active VNF (Virtual Network Function) when the route is withdrawn. Failed interfaces can lead to a blackout. A failed remote host can cause a brownout for an active VNF.

When an event occurs related to any of these circumstances then the event may be applied to policies to determine whether a switchover should be attempted. A stateful HA may track the availability of BGP neighbor peers, VRRP state, and other factors and decide whether to remain active or transition to a standby role by comparing these factors to those of a standby node. The comparison may be initiated by the active node, for example a VNF, negotiating with a standby node, for example another VNF, to transition to active when the standby node has better data communication metrics.

For a switchover with VRRP, the active node will initially be in a VRRP Master state but may change its status to a Backup state after the switchover and not remain in a VRRP master state. Without such a change in status, the traffic may be punted between active and backup nodes thereby increasing the load on the overall system. In some embodiments, VRRP tracks the configured routes and network interface availability to decide whether to transition a node to backup or to stay in the master role.

FIG. 1 is a simplified diagram of a wired or wireless network in which multiple nodes, for example routers, have redundant paths between multiple clients and the cloud or the Internet. As used herein network communication devices are referred to as nodes. A node may be a router or it may be another device that receives data traffic and sends the data traffic to another node. As such, "nodes" are intended to include "routers" and also a variety of other physical or virtual devices to which the techniques and structures herein may apply. A first node 102 is an active VNF that is coupled to a second node 104 that is a standby VNF through a high availability (HA) link 106. The first and the second nodes 102, 104 may be physical nodes or virtualized resources. The first and the second nodes 102, 104 also communicate on the link through VRRP and have a status relationship in which the first node 102 is a VRRP master and the second node 104 is a VRRP backup. The first and the second nodes are both coupled to a client network 108 that includes multiple clients C1, C2, C3. The first and the second nodes are both coupled to an AR (Access Router) 112 through E-BGP (External Border Gateway Protocol) 110. The AR 112 is coupled to a second client network 114 with clients C4, C5.

On the northbound side and opposite from the clients on the southbound side of the diagram, the first and the second nodes 102, 104 are coupled to a first PE (Provider Edge) 122 and a second PE 124. The first and second PEs 122, 124 are coupled through a WAN (Wide Area Network) 120 to further external resources, for example the Internet 128. The first and second PEs 122, 124 are both connected to each of the first and second nodes 102, 104. In other words, the first node 102 is coupled to both the first and the second PE 122, 124 using E-BGP. The second node 104 is also coupled to both the first and the second PE 122, 124 using E-BGP. The simplified diagram shows how the first and the second nodes 102, 104 are connected so that if either one fails, then the other one can make all of the same connections. The same is true of the first and the second PEs 122, 124. In addition, if there is a failure in any of the links used by one of the nodes then there is likely to be an alternative link coupled to the other one of the nodes that can be used as an alternative. While the first and the second nodes 102, 104 are indicated as being configured as VNFs, alternative configurations may be used to suit different implementations.

Figure 2:
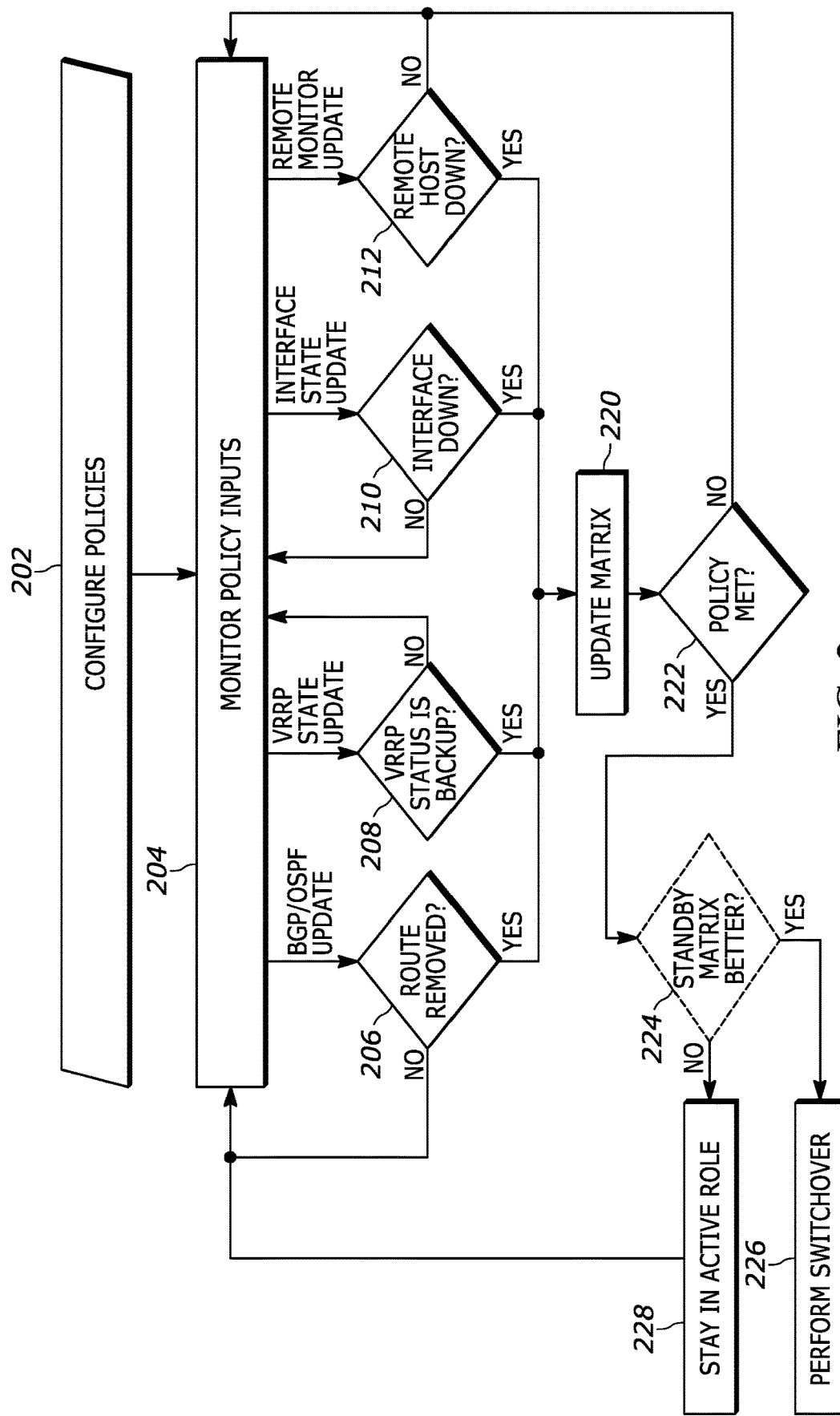
FIG. 2 is a process flow diagram of making a switchover decision using policies and optionally a matrix according to embodiments of the present invention.

FIG. 2 is a process flow diagram of making a switchover decision using policies and optionally a matrix. A process begins at 202 with configuration of one or more switchover policies. These polices may be adapted to suit the configuration of the network and the availability of protocols, routes, neighbor routers and other resources. The policies at 202 are designated for a particular node and different nodes in a network may have different policies. In the present example, the policies are configured for the first node 102 and identical policies are configured for the second node 104. At least some of the policies have an input and produce an output based on the input.

At 204 the policy inputs are monitored. These inputs may include multiple characteristics of the network that affect the ability of the node to support traffic through the network from and to any other nodes. In the present example, four such network characteristics are monitored but embodiments may have more or fewer or different characteristics. The first characteristic is the availability of a BGP or OSPF (Open Shortest Path First) neighbor or next hop router. In some embodiments, multiple neighbors may be monitored. As examples, the AR 112 and the first and second PEs 122, 124 may be monitored. A status update on any monitored BGP or OSPF neighbor is tested at 206. If the route to the neighbor has been removed, then the process updates a parameter matrix at 220 that is maintained by or for the node.

A second characteristic is the VRRP status of the node. In a VRRP system the primary traffic should be routed through a VRRP master node. This status is monitored so that when the status of the node is changed to backup, the policy input monitor generates an update and the status is tested at 208. If the status is backup then the process updates the parameter matrix at 220.

A third characteristic is the status of the network interfaces to which the node connects. The monitor policy inputs operation 204 sends messages to interfaces of connected nodes and monitors their status. When a node interface is down at 210, then the parameter matrix is updated at 220. The interface may be down due to a broken connection or a restart of the connection or of the other node. The status of one or more interfaces may be monitored depending on the network configuration.

A fourth characteristic is the status of a remote host, for example, an intermediate router, or any other connected router. As with the other characteristics there may be one or more remote hosts that are monitored. In some embodiments, the monitor policy inputs operation 204 pings the remote host at time intervals. When the ping indicates that the remote host is no longer available then a test at 212 indicates that the host is down and the parameter matrix is updated at 220.

The node maintains a parameter matrix of one or more of the characteristics shown herein. These characteristics are also referred to as network routing parameters, however the parameter matrix may also contain other information of similar and different kinds. When the parameter matrix is changed, the values in the parameter matrix may be applied to one or more policies at 222. The policies may be in the form of testing a parameter matrix count against a rule. If the rule is not satisfied, then the policy is not met and the process returns to monitor the policy inputs. A policy may have multiple rules that are applied in a specific sequence or that are conditional on other rules. If the one or more rules are satisfied and the policy is met, then the process optionally goes to a capability matrix comparison at 224 at which the process determines if a capability matrix of a standby node is better than a capability matrix at this active node. The capability matrix contains information about the availability of network resources and may have the same information as the parameter matrix or less information. The policies in this process are met when there is a failure or reduction in the available resources. If the standby node capability matrix shows that the standby node has experienced the same or more failures or resource reduction, then at 228 that active node will stay active and there is no switchover. The capability matrix shows the network capabilities of the respective node. The capability matrix comparison allows capabilities of the nodes to be compared using a convenient matrix configuration. However, a matrix is used herein for ease of understanding. The capabilities of an active node may be compared to the capabilities of a standby node using data configurations other than or, in addition to, a matrix.

On the other hand, if the standby node has a better capability matrix in that it has access to more or better network resources, then at 226 a switchover to the standby node is performed. The traffic that was carried by the active node is moved over to the standby node. The standby node becomes the active node and the active node becomes a standby node. In a VRRP context the master becomes the backup and the backup is changed to the master. The switchover is performed with a transfer of state but without any restart. This improves availability because the nodes stay active through the process.

FIG. 2 is directed to a process that is performed at the active or master node. At 224, the capability matrix is compared to a capability matrix that was maintained by an associated standby or backup node. The standby or backup node performs the same operations as described for the active or master node as shown in FIG. 2 so that its capability matrix is maintained and ready for a valid comparison. In other words, even if the backup node is not actively communicating data traffic or is actively communicating other unrelated data traffic, the monitor policy inputs operation 204 is performed for the network characteristics that are important to the operation of the standby node as a standby for the active node. The configured policies at 202 may be the same or different to suit the network configuration. The interaction between the two nodes is described in more detail below.

Table 1 is a simplified example of a parameter matrix for a first active node and Table 2 is a simplified example of a parameter matrix for a second standby node. These nodes may correspond to the active VNF 102 and Standby VNF of FIG. 1 as well as to the Active Node 302 and Standby Node 304 of FIG. 3 and the other sequence diagrams. The parameter matrix is presented as a two-dimensional table for ease of understanding but may take any of a variety of other forms, including unstructured text strings, metadata, and configuration registers. There may be more or fewer entries to suit different network configurations. In this example, the rows are selected to align with the policy inputs of FIG. 2. More or fewer policy inputs may be used.

TABLE 1

| Object | Count |
|---|---|
| Interface | 3 (Up) |
| Routes | 5 (Installed) |
| Remote Host Monitor | 3 (Reachability is Up) |
| VRRP Group | 2 (Master) |

TABLE 2

| Object | Count |
| --- | --- |
| Interface | 3 (Up) |
| Routes | 4 (Installed) |
| Remote Host Monitor | 3 (Reachability is Up) |
| VRRP Group | 1 (Master) |

The values in Table 1 are values that were determined by the first node and will be applied to the policies configured for the first node, an active node. The values in Table 2 were determined by the second node and will be applied to the policies configured for the second node which is a VRRP backup node with respect to the first node but a VRRP Master for other purposes. Table 1 shows values as counts for network interfaces, routes, monitored remote hosts and VRRP group status. Each time one of the counts changes, the parameter matrix is updated as at block 220 and the policies are applied as at block 222.

The nodes may have any of a wide range of different policies active for managing operations including the network interfaces, routes, remote hosts, and groupings, for example VRRP groups, mentioned above. A particular set of policies may be configured to support switchover for high availability and while a few examples are provided more, fewer, and different policies may be used. In some embodiments, the switchover policies are based around the characteristics discussed above of interfaces, routes, remote host monitoring and VRRP group status. An example policy would be that if the VRRP master count is less than three then go to a switchover. In Table 1, the VRRP master count is 2 so, upon updating the count in the parameter matrix from 3 to 2, the policy would be met and a switchover would be invoked. Similarly, an interface count of less than 3 may invoke a switchover. This policy is not met by Table 1. Another example policy would be first to determine if the interface count is less than 4 based on an update to the parameter matrix, then determine if the remote host monitor count is less than 3. If both conditions are met, then a switchover is invoked. For this example, the first condition is met by Table 1 but the second condition is not. Accordingly, switchover would not be invoked. These policies may be described another way using a pseudocode representation as follows.

The below example considers only the count for the number of active network interfaces that are available to the node. If there are not enough network interfaces, then the traffic is switched over to a node that has more network interfaces. The tracked network characteristics are first named and a tracking function is established. This tracking applies to all of the examples and in some embodiments more characteristics are tracked. The rule applies a comparison operator, less than, to the interface count. If the rule is not met, then the switchover is rejected. The rule may be reversed to apply a greater than or equal comparison operator to the count that results in a switchover rejection. The rule may also be written to use different comparison operators.

Track-interfaces=>Inf-1, Inf-2, Inf-3, Inf-4, Inf-5
Track remote host monitors=>H1, H2, H3, H4, H5
switchover policy begin
   rule-1 begin
   if interface count less than 3;
   then switchover
   endif
   rule-1 end This example policy has a single rule and the rule is to switch over if there are less than three active network interfaces.

The below example considers the number of active network interfaces and the number of active remote hosts detected by the remote host monitor. The rules are sequential in that rule 2 is not assessed unless rule 1 is not satisfied. This policy may be stated as first, a switchover is declared if there are less than three out of the five total network interfaces in an UP state (i.e., any two interfaces go down). Second, if the first rule is not satisfied, then a switchover is declared if any one interface goes down and any two of the five total tracked host monitors go down. The first rule applies a less than comparison operator to the network interface count and the second rule applies a less than comparison operator to the remote host monitor count. If the rule is not met then switchover is rejected. The first rule may be made a condition precedent of the second rule. In other words, the second rule may be conditional on the first rule being met.

Track-interfaces=>Inf-1, Inf-2, Inf-3, Inf-4, Inf-5
Track remote host monitors=>H1, H2, H3, H4, H5
switchover-policy begin
   rule-1 begin
   if interface-count less-than 3;
   then switch-over
   endif
   rule-1 end
   rule-2 begin
   if interface-count less-than 4
   and remote-host-monitor-count less-than 3;
   then switch-over
   endif
   rule-2 end
switchover policy end A third example considers only the number of VRRP groups that are in Master state at the active node. When an event or interrupt is received from a VRRP module at the active node then this third example policy may be invoked. This policy has a single rule that if any one VRRP group transitions to Backup from the three Master VRRP groups being tracked, then a switchover process is started. This rule applies a less than comparison operator to the VRRP group master count.

Track-vrrp-groups=>VR1, VR2, VR3
switchover-policy begin
   rule-1 begin
   if vrrp-group-master-count less-than 3;
   then switch-over
   endif
   rule-1 end
switchover-policy end While only three example policies are shown, more or fewer may be used. The policies may also be combined in any particular sequence as shown, for example, in the second example. There may be more than two rules in any policy. While the three example policies relate to VRRP status, network interface status and remote host monitor, other monitored status events may be used as inputs. One such input is a BGP/OSPF route status or event but there may be many others.

Upon determining that a policy is met at 222 of FIG. 2, as for example when the network interface count is below 3, then the process at the active node may optionally go to a capability matrix comparison 224. As mentioned above, the capability matrix may have many more or fewer entries than are necessary to evaluate the policies and may have configurations that are different from a parameter matrix. A capability matrix is presented here for ease of understanding. For comparison only a portion of the parameter matrix of Table 1 and Table 2 is needed. Table 3 is a portion of the parameter matrix of Table 1 maintained by the active node and Table 4 is a portion of the parameter matrix of Table 2 maintained by the standby node. In a matrix comparison, the values are the same except that Table 3 corresponding to the active node has more active routes than Table 4 corresponding to the standby node. As a result, the standby node has worse accessibility and a switchover from the active node to the standby node will degrade traffic availability. The operation of the process of FIG. 2 will be to reject the switchover because the standby node capability matrix is not better and for the current node to stay in the active role at 228.

TABLE 3

| Object | Count |
| --- | --- |
| Interface | 3 (Up) |
| Routes | 5 (Installed) |
| Remote Host Monitor | 3 (Reachability is Up) |

TABLE 4

| Object | Count |
| --- | --- |
| Interface | 3 (Up) |
| Routes | 4 (Installed) |
| Remote Host Monitor | 3 (Reachability is Up) |

Figure 3:
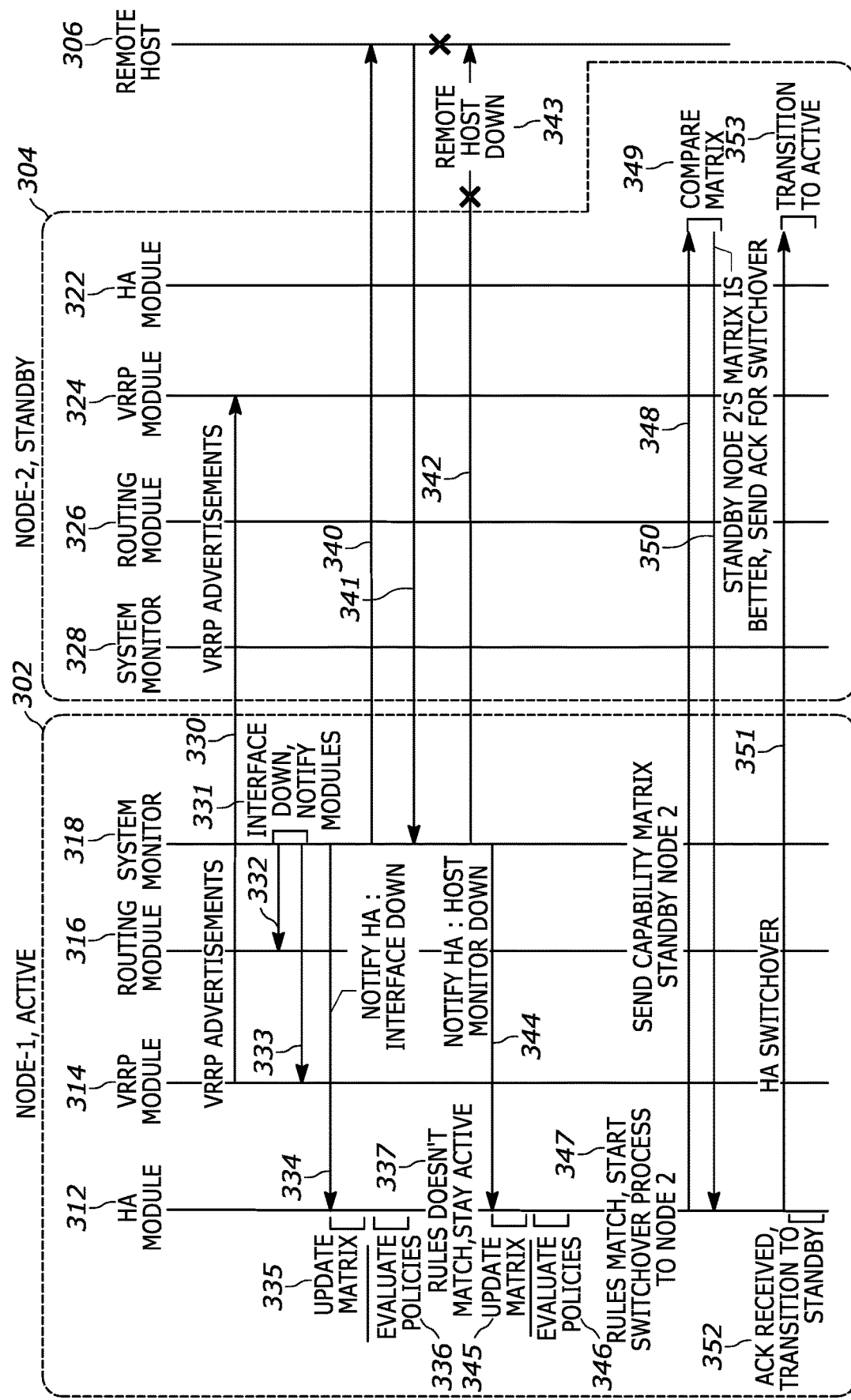
FIG. 3 is a sequence diagram of two nodes performing a switchover in response to a network interface and remote host interface going down according to embodiments of the invention.

The values used for the capability matrix comparison may be modified to suit particular node and network implementations. In the example of Tables 3 and 4 the VRRP status is not used for comparison because it is not relevant to a node's availability to process traffic. The VRRP group state will always differ between the active node and the standby node because one would be in the Master state and other in the Backup state. In such an event, a comparison is not useful FIG. 3 is a sequence diagram of two nodes performing a switchover in response to a network interface and remote host interface going down. The sequence diagram shows an example of the operations of FIG. 2 in a particular example. These operations include monitoring network interfaces and remote hosts, updating the parameter matrix to reflect changes, applying the changes as policy inputs, comparing matrices, and performing a switchover to a standby node. FIG. 3 has an active node 302, a standby node 304, and a remote host 306, for example a next hop BGP router, all connected through a network, for example the network of FIG. 1 or any other suitable data communications network. The active node includes a High Availability (HA) module 312, a VRRP module 314, a routing module 316, and a system monitor 318. Similarly, the standby node 304 includes a HA module 322, a VRRP module 324, a routing module 326, and a system monitor 328. The modules may have dedicated physical hardware resources, dedicated virtual resources, or may exist as portions of larger systems. The sequence diagram shows only certain example signals to illustrate particular parts of the system operation. Many more signals may be sent and received before during and after the signals described herein.

At 330, as a part of normal network interface operations, the VRRP module 314 of the active node 302 sends VRRP advertisements 330 to the standby node 304 VRRP module 324. In the same way advertisements may be sent to many other modules (not shown). The first trigger in the sequence occurs when the system monitor 318 detects 331 that a network interface is down. In response, the active node 302 system monitor 318 sends a notification 332 to the routing module 316, a notification 333 to the VRRP module 314 and a notification 334 to the HA module 312. In this way, the system monitor 318 is performing an operation 204 of monitoring the policy inputs and determining whether there are updates or status changes 206, 208, 210, 212 as shown in FIG. 2. In some embodiments, the system monitor operates as a background application, for example a daemon, and generates and sends interrupts or alerts to the modules 312, 314, 316 of the active node 302 in which it operates.

In response to receiving an interface down notification 333, the VRRP module 314 changes the corresponding VRRP group state of the active node 302 from the master state to the standby state.

In response to receiving an interface down notification 334, the HA module 312 of the active node 302 updates 335 the active node 302 parameter matrix with the new network interface value. In this case, the value is reduced by one. The HA module 312 evaluates 336 the policies using the new value for network interfaces as input to the policies. At 337, the rules do not match. The policies are not met and no switchover is taken. The active node 302 stays active. Alternatively, if the rules do match, then a switchover may be requested as shown, for example, at 347.

In a separate process, at 340, the system monitor 318 of the active node 302 pings the remote host 306. While only one remote host 306 is shown, there may be multiple remote hosts and the same or a similar process may be applied to each. At 341, the remote host replies and so the status has not changed and there is no action taken. After this first ping 341, the remote host 306 or the connection to the remote host 306 fails 343. At 342, the system monitor 318 of the active node 302 pings the same remote host 306 again. However, at 343 the remote host 306 is down and does not send a reply. Accordingly, the system monitor 318 of the active node 302 detects the change in the host monitor status, generates an interrupt or alert and sends 344 the interrupt or alert to the HA module 312 of the active node 302 that the remote host 306 is down. The HA module 312 updates 345 the remote host field of the parameter matrix and evaluates 346 the policies by applying the parameter matrix update as a new input to the policies. In this example, the rules match at 347 and the HA module 312 starts 347 a switchover process to the standby node 304. If the rules do not provide a match, then no switchover is requested.

In this embodiment, the switchover works only if a capability matrix comparison indicates a switchover. For a switchover, the HA module 312 of the active node 302 sends 348 a capability matrix to a suitable switchover candidate, in this case the illustrated HA module 322 of the standby node 304. The HA module 322 of the standby node 304 receives the capability matrix and compares 349 the received capability matrix to the capability matrix of the standby node 304. If the standby node 304 capability matrix is better, then the standby node 304 HA module 322 sends a switchover acknowledgement 350 back to the active node 302 HA module 312. Alternatively, if the capability matrix is not better, then a negative acknowledgment (NACK) may be sent instead. The active node 302 HA module 312 answers with an HA switchover signal 351 and also transitions 352 to a standby state. The standby node 304 HA module 322 upon receiving the switchover signal 351 transitions 353 to an active state. There may be a parameter matrix update operation (not shown) after the switchover operation is complete.

Figure 4:
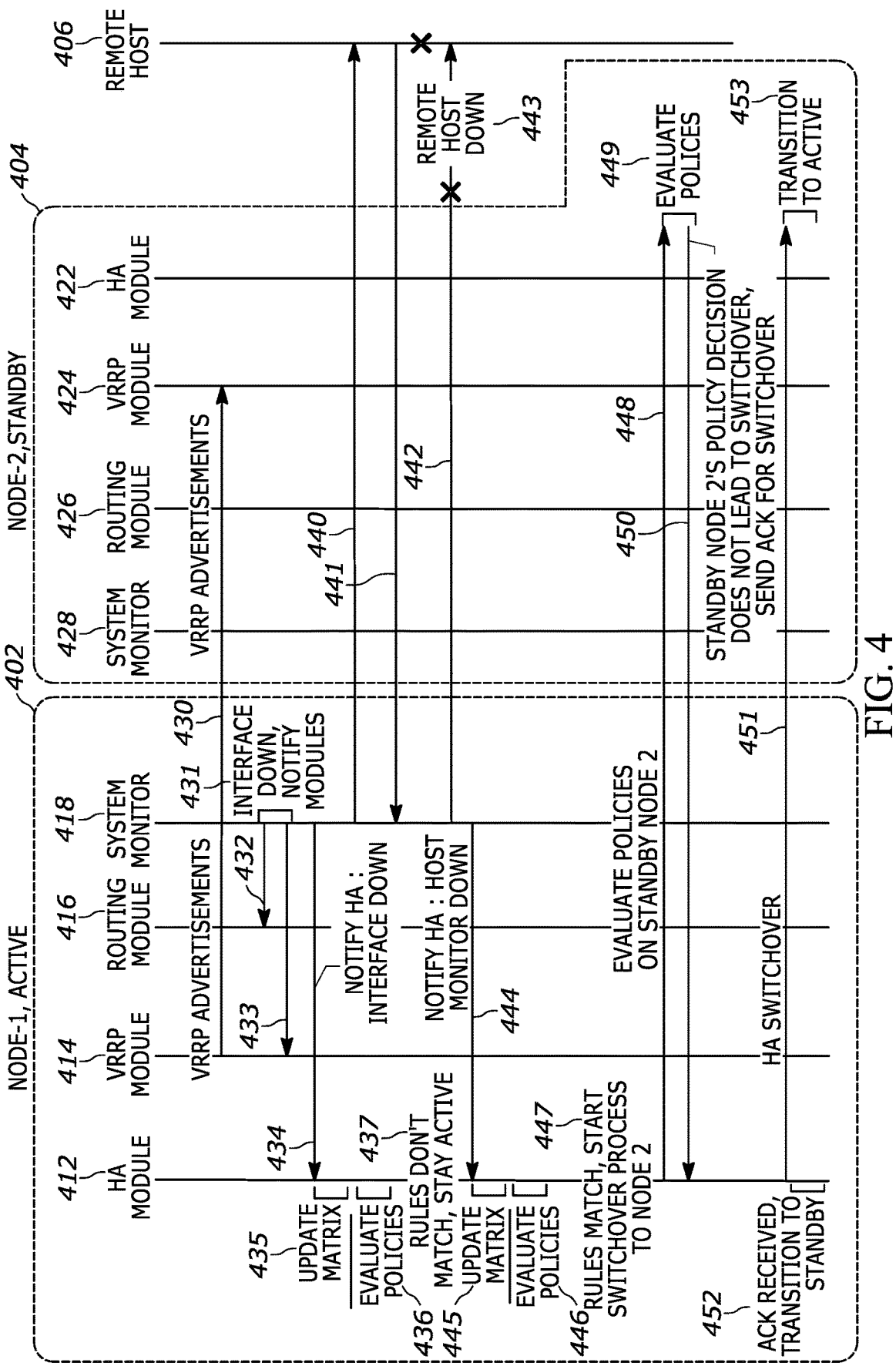
FIG. 4 is an alternative sequence diagram of two nodes performing a switchover in response to a network interface and remote host interface going down according to embodiments of the invention.

FIG. 4 is an alternative sequence diagram of two nodes performing a switchover in response to a network interface and remote host interface going down. The sequence diagram shows an example of the operations of FIG. 2 in a particular example. These operations include monitoring network interfaces and remote hosts, updating the parameter matrix to reflect changes, applying the changes as policy inputs, comparing matrices, and performing a switchover to a standby node. FIG. 4 has an active node 402, a standby node 404, and a remote host 406 all connected through a network, for example the network of FIG. 1 or any other suitable data communications network. The active node includes a High Availability (HA) module 412, a VRRP module 414, a routing module 416, and a system monitor 418. Similarly, the standby node 404 includes a HA module 422, a VRRP module 424, a routing module 426, and a system monitor 428. The modules may have dedicated physical hardware resources, dedicated virtual resources, or may exist as portions of larger systems. The sequence diagram shows only certain example signals to illustrate particular parts of the system operation. Many more signals may be sent and received before during and after the signals described herein.

At 430, as a part of normal network interface operations, the VRRP module 414 of the active node 402 sends VRRP advertisements 430 to the standby node 404 VRRP module 424. In the same way advertisements may be sent to many other modules (not shown). The first trigger in the sequence occurs when the system monitor 418 detects 431 that a network interface is down. In response, the active node 402 system monitor 418 detects this condition as a network interface status change at 431 and sends a notification 432 to the routing module 416, a notification 433 to the VRRP module 414 and a notification 434 to the HA module 412. In this way, the system monitor 418 is performing an operation 204 of monitoring the policy inputs and determining whether there are updates or status changes 206, 208, 210, 212 as shown in FIG. 2. In some embodiments, the system monitor operates as a background application, for example a daemon, and generates and sends interrupts or alerts to the modules 412, 414, 416 of the active node 402 in which it operates.

In response to receiving an interface down notification 433, the VRRP module 414 changes the corresponding VRRP group state of the active node 402 from the master state to the standby state.

In response to receiving an interface down notification 434, the HA module 412 of the active node 402 updates 435 the active node 402 parameter matrix with the new network interface value. In this case, the value is reduced by one. The HA module 412 evaluates 436 the policies using the new value for network interfaces as input to the policies. At 437, the rules do not match. The policies are not met and no switchover is taken. The active node 402 stays active. Alternatively, if the rules do match, a switchover may be requested using a switchover request signal 448. In this case, the switchover may occur before the remote host is down at 443.

In a separate process, at 440, the system monitor 418 of the active node 402 pings the remote host 406. While only one remote host 406 is shown, there may be multiple remote hosts and the same or a similar process may be applied to each. At 441, the remote host replies and so the status has not changed and there is no action taken. After this first ping 441, the remote host 406 or the connection to the remote host 406 fails 443. At 442, the system monitor 418 of the active node 402 pings the same remote host 406 again. However, the remote host 406 is down and does not send a reply. Accordingly, upon not receiving the reply, the system monitor 418 of the active node 402 detects the change in the status of the host monitor, generates an interrupt and sends 444 the interrupt or alert to the HA module 412 of the active node 402 that the remote host 406 is down. The HA module 412 updates 445 the remote host field of the parameter matrix and evaluates 446 the policies by applying the parameter matrix update as a new input to the policies. In this example, the rules match at 447 and the HA module 412 starts a switchover process to the standby node 404. If the rules do not match then there is no switchover request.

In this embodiment, the switchover works only if the standby node 404 policy evaluation indicates a switchover. For a switchover, the HA module 412 of the active node 402 sends a switchover request signal 448 to a suitable switchover candidate, in this case the illustrated HA module 422 of the standby node 404. The HA module 422 of the standby node 404 receives the switchover request signal 448 and then evaluates 449 its own policies against its own capability matrix. If the standby node 404 policy evaluation does not indicate a switchover, i.e., the standby node switchover polices are not met, then the standby node 404 HA module 422 sends a switchover acknowledgement 450 back to the active node 402 HA module 412. The active node 402 HA module 412 answers with an HA switchover signal 451 and also transitions 452 to a standby state. The standby node 404 HA module 422 upon receiving the switchover signal 451 transitions 453 to an active state. There may be a parameter matrix update operation (not shown) after the switchover operation is complete. The policy evaluation at the standby node 404 prevents an immediate switchover back to the originating node. Without the policy evaluation, the standby node 404, after becoming active, might evaluate its own policies and then request a switchover back to the previously active node 402. This node would then become active and again request a switchover and so on so that the traffic routing does not stabilize.

Figure 5:
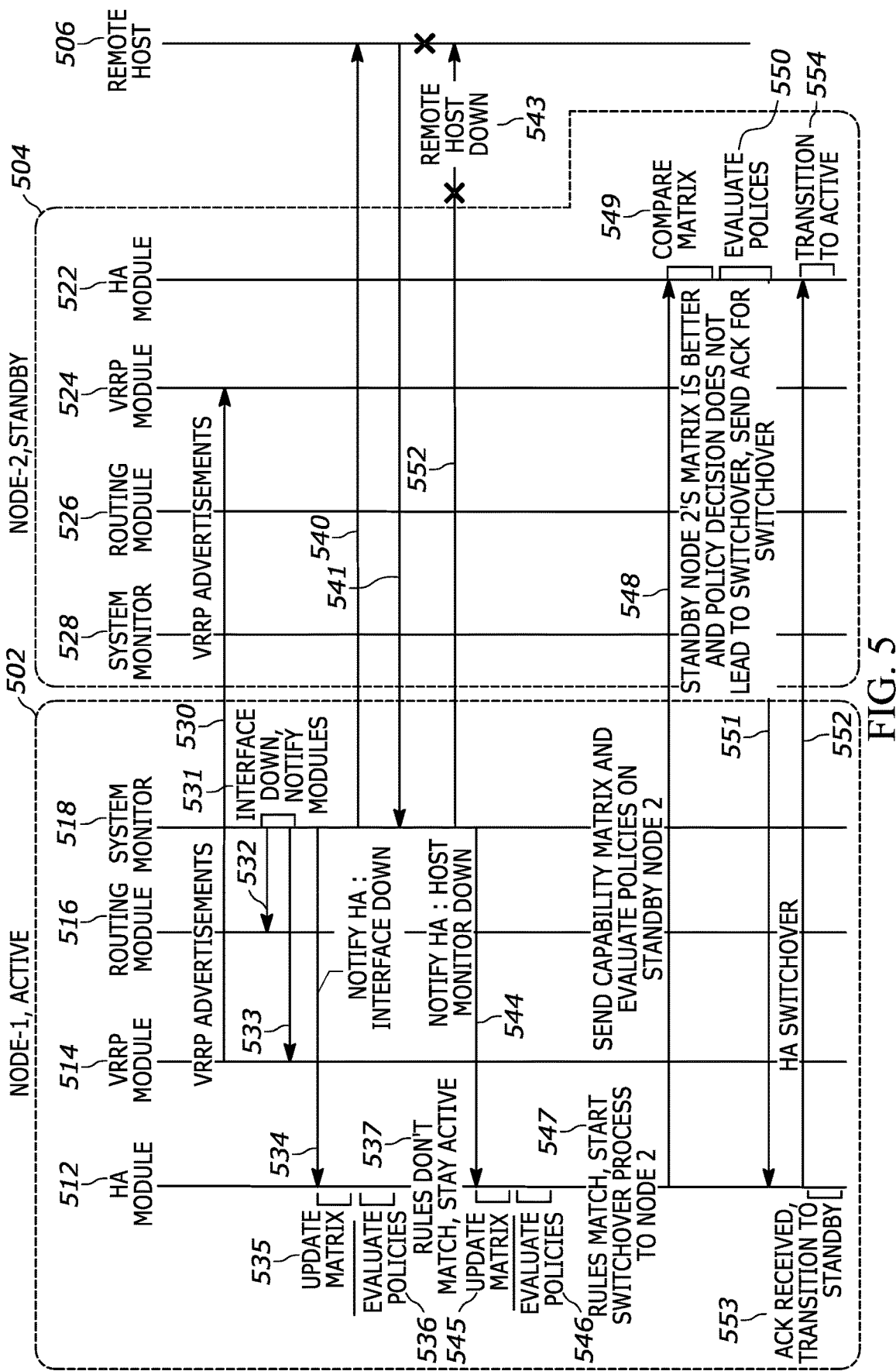
FIG. 5 is another alternative sequence diagram of two nodes performing a switchover in response to a network interface and remote host interface going down according to embodiments of the invention.

FIG. 5 is a second alternative sequence diagram of two nodes performing a switchover in response to a network interface and remote host interface going down. This example combines the capability matrix comparison of FIG. 3 and the policy evaluation of FIG. 4 into the same switchover process. FIG. 5 has an active node 502, a standby node 504, and a remote host 506 all connected through a network, for example the network of FIG. 1 or any other suitable data communications network. The active node includes a High Availability (HA) module 512, a VRRP module 514, a routing module 516, and a system monitor 518. Similarly, the standby node 504 includes a HA module 522, a VRRP module 524, a routing module 526, and a system monitor 528. At 530, the VRRP module 514 of the active node 502 sends VRRP advertisements 530 to the standby node 504 VRRP module 524. In the same way advertisements may be sent to many other modules (not shown). The first trigger in the sequence occurs when the system monitor 518 detects 531 that a network interface is down. In response, the active node 502 system monitor 518 detects this condition as a network interface status change at 531 and sends a notification 532 to the routing module 516, a notification 533 to the VRRP module 514 and a notification 534 to the HA module 512.

In response to receiving an interface down notification 433, the VRRP module 414 changes the corresponding VRRP group state of the active node 402 from the master state to the standby state.

In response to receiving an interface down notification 534, the HA module 512 of the active node 502 updates 535 the active node 502 parameter matrix with the new network interface value. The HA module 512 evaluates 536 the policies using the new value for network interfaces as input to the policies. At 537, the rules do not match. The policies are not met and no switchover is taken. The active node 502 stays active.

In a separate process, at 540, the system monitor 518 of the active node 502 pings the remote host 506. At 541, the remote host replies and so the status has not changed and there is no action taken. After this first ping 541, the remote host 506 or the connection to the remote host 506 fails 543. At 542, the system monitor 518 of the active node 502 pings the same remote host 506 again. However, the remote host 506 is down and does not send a reply. Accordingly, the system monitor 518 of the active node 502 detects the change in the status of the host monitor, generates an interrupt and sends 544 the interrupt to the HA module 512 of the active node 502 that the remote host 506 is down. The HA module 512 updates 545 the remote host field of the parameter matrix and evaluates 546 the policies by applying the parameter matrix update as a new input to the policies. In this example, the rules match at 547 and the HA module 512 starts 547 a switchover process to the standby node 504. In this embodiment, the switchover works only if the standby capability matrix is better and the standby node 504 policy evaluation indicates no switchover from the standby node to the active node or another node.

For a switchover, the HA module 512 of the active node 502 sends 548 a capability matrix to the HA module 522 of the standby node 504. The HA module 522 of the standby node 504 receives the capability matrix and compares 549 the received capability matrix to the capability matrix of the standby node 504. If the standby node 504 capability matrix is better, then the HA module 522 of the standby node 504 evaluates 550 its own policies against its own capability matrix. In this embodiment, the two tests 549, 550 are sequential and conditional in that the first test must be met before the second test is performed. The particular sequence and relationships of the tests may be modified to suit different circumstances. If the standby node 504 policy evaluation does not indicate a switchover, then the standby node 504 HA module 522 sends a switchover acknowledgement 551 back to the active node 502 HA module 512.

The active node 502 HA module 512 answers with an HA switchover signal 552 and also transitions 553 to a standby state. The standby node 504 HA module 522 upon receiving the switchover signal 552 transitions 554 to an active state. There may be a parameter matrix update operation (not shown) after the switchover operation is complete. Alternatively, the policy evaluation may be performed before the capability matrix comparison. On the other hand, if either the standby capability matrix is not better or the standby policy evaluation indicates a switchover, then the standby node may send a NACK instead of the ACK 551 as shown rejecting the switchover request and no switchover is performed.

Figure 6:
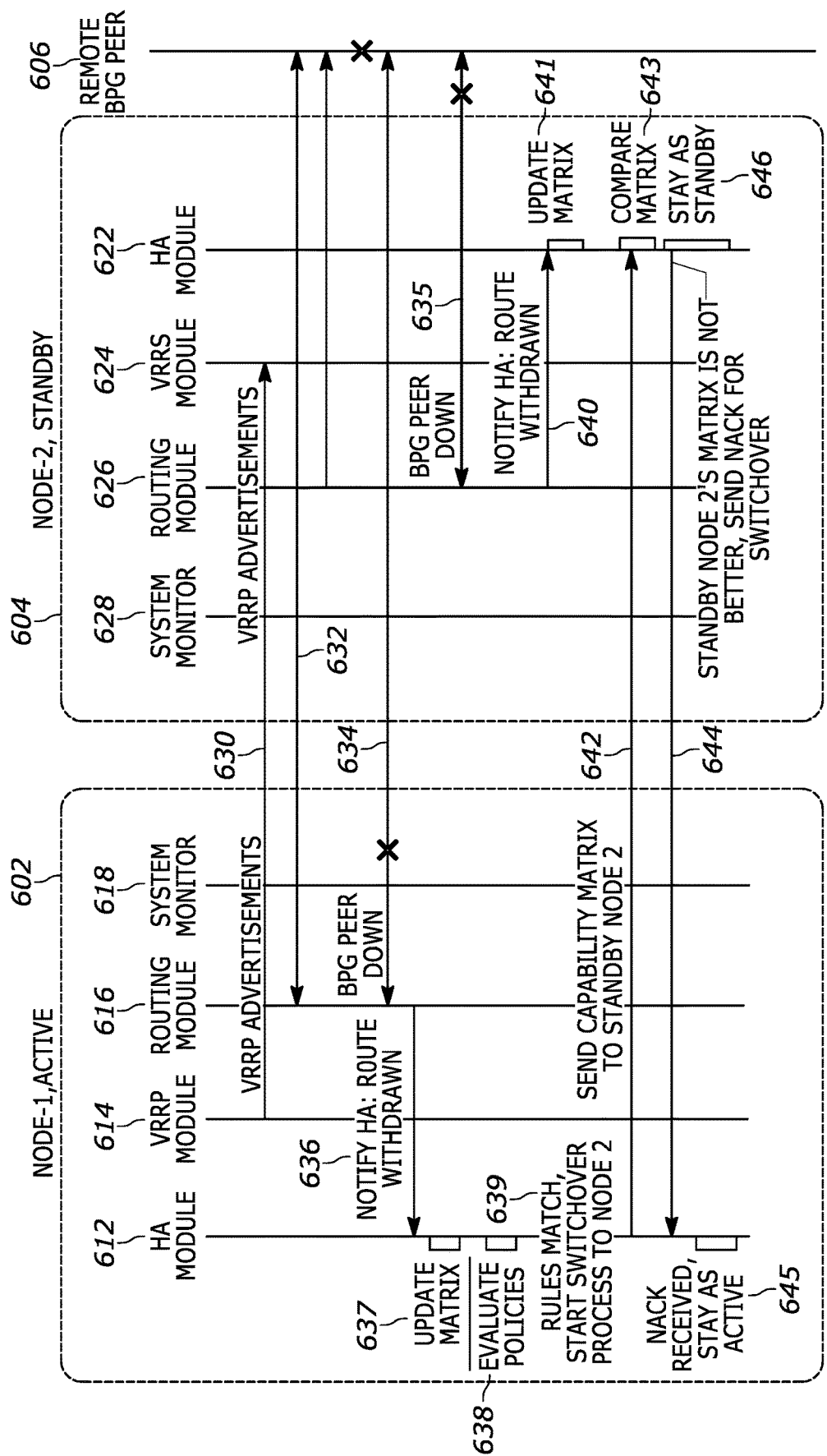
FIG. 6 is a sequence diagram of two nodes performing a switchover in response to a connected BGP peer route being withdrawn according to embodiments of the invention.

FIG. 6 is a sequence diagram of two nodes performing a switchover in response to a connected BGP peer route being withdrawn. The sequence diagram shows another example of the operations of FIG. 2 in a particular example. These operations include monitoring VRRP states and BGP/OSPF updates, updating the parameter matrix to reflect changes, applying the changes as policy inputs, comparing matrices, and not performing a switchover to a standby node. FIG. 6 has an active node 602, a standby node 604, and a connected remote BGP peer 606 all connected through a network, for example the network of FIG. 1 or any other suitable data communications network. The remote BGP peer may be a neighbor router, a next hop router, or a more remote router. The same techniques and messages may also apply in the case or an OSPF peer or neighbor. The active node includes a High Availability (HA) module 612, a VRRP module 614, a routing module 616, and a system monitor 618. Similarly, the standby node 604 includes a HA module 622, a VRRP module 624, a routing module 626, and a system monitor 628. The modules may have dedicated physical hardware resources, dedicated virtual resources, or may exist as portions of larger systems. The sequence diagram shows only certain example signals to illustrate particular parts of the system operation. Many more signals may be sent and received before during and after the signals described herein.

At 630, as a part of normal network interface operations, the VRRP module 614 of the active node 602 sends VRRP advertisements 630 to the standby node 604 VRRP module 624. As shown, there are BGP messages 632 between the connected remote BGP peer 606 and the routing module 616 of the active node 602. There are also BGP messages 633 between the connected remote BGP peer 606 and the routing module 626 of the standby node 604. At some later time, the connected remote BGP peer 606 connection fails and then there is a failed message 634 from the disconnected remote BGP peer 606 that fails to reach the routing module 616 of the active node 602. The route to the BGP peer 606 may be withdrawn due to a failure of the BGP peer, the active node or any other node along the route. The routing module 616 of the active node 602 will not receive the failed message 634. In addition, any message (not shown) from the routing module 616 of the active node 602 will not reach the BGP peer 606, and the routing module 616 will not receive any acknowledgements from the BGP peer 606 for sent messages. Accordingly, the active node 602 routing module 616 detects the change in the BGP peer status generates a BGP route update in light of this condition and sends a route withdrawn notification 636 to the HA module 612. In some embodiments, the system monitor 618 operates as a background application, for example a daemon, and sends interrupts or alerts to the modules 612, 614, 616 of the active node 602 in which it operates.

In response to receiving the route withdrawn notification 636, the HA module 612 of the active node 602 updates 637 the active node 602 parameter matrix with the new route availability value. In this case, the value is reduced by one. The HA module 612 evaluates 638 the policies using the new value for routes as input to the policies. At 639, the rules match and the switchover process is started. The HA module 612 at the active node 602 sends a switchover request signal 642 including its capability matrix to the HA module 622 of the standby node 604 to start a switchover to the standby node.

In a separate process, at 635, the routing module 626 of the standby node 604 also fails to receive a failed message 635 from the remote BGP peer 606. The routing module will also fail to receive acknowledgements of messages that are attempted to be sent to the remote BGP peer 606. At 640 the routing module 626 of the standby node 604 sends a route withdrawn interrupt or alert 640 to the HA module 622 of the standby node 604 that the remote BGP peer 606 is down or at least the route to the remote BGP peer is withdrawn. The HA module 622 updates 641 the BGP route field of the standby node 604 parameter matrix.

For a switchover from the active node 602, the HA module 612 of the active node 602 sends a switchover request signal that includes 642 a capability matrix to a suitable switchover candidate, in this case the illustrated HA module 622 of the standby node 604. The HA module 622 of the standby node 604 receives the capability matrix and compares 643 the received capability matrix to the capability matrix of the standby node 604. If the standby node 604 capability matrix is better, then the standby node 604 HA module 622 sends a switchover acknowledgement back to the active node 602 HA module 612. In this embodiment, the standby node 604 capability matrix is not better and so a negative acknowledgement (NACK) 644 is sent from the standby node 604 HA module 622 to the active node 602 HA module 612 rejecting the switchover request. No switchover is made. The active node 602 HA module 612 receives the NACK 644 as a rejection and remains active or sends a switchover request to a different standby node (not shown). Similarly, the standby node 604 HA module 622 after sending the NACK 644 remains in the standby status.

Figure 7:
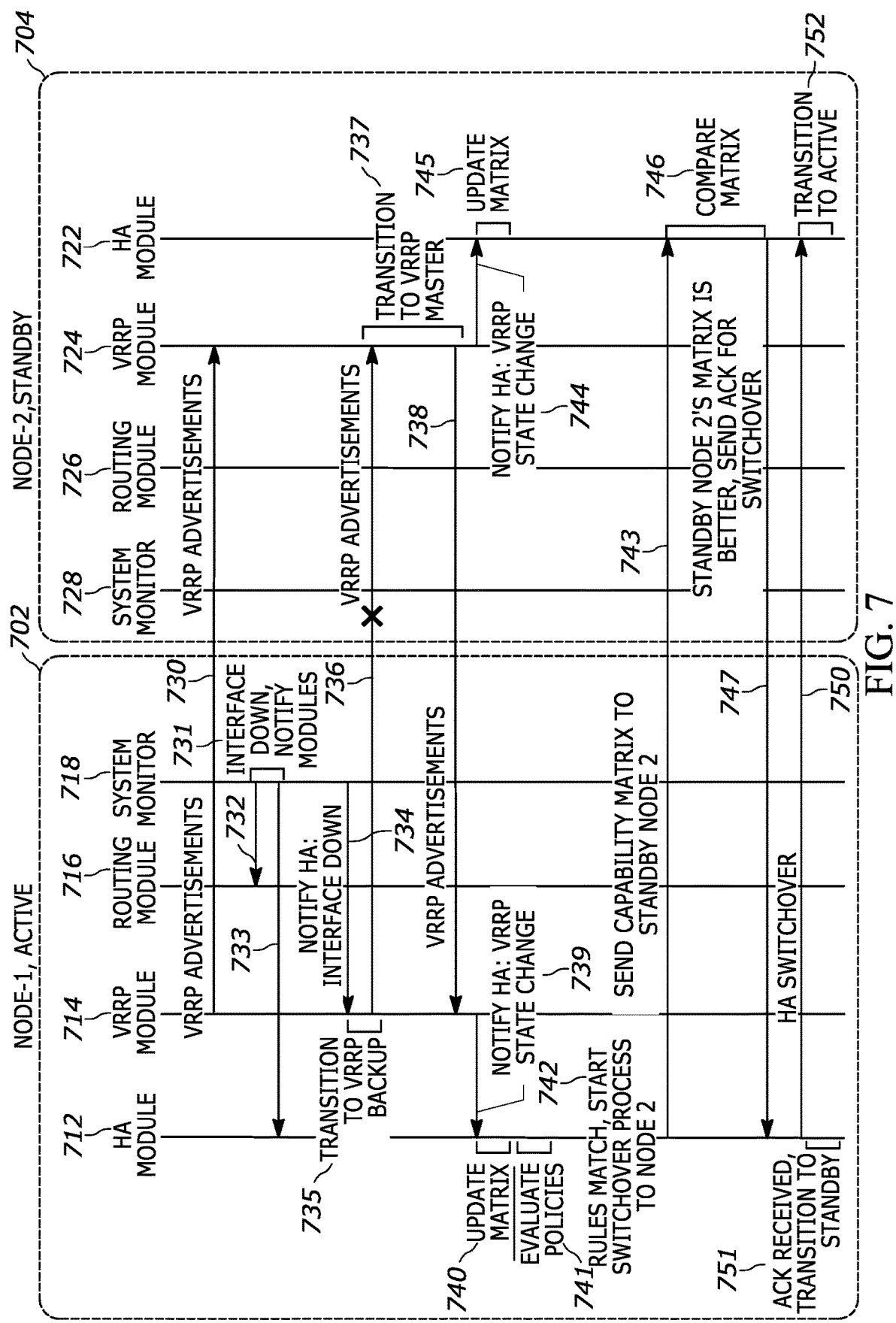
FIG. 7 is a sequence diagram of two nodes performing a switchover in response to a VRRP status change according to embodiments of the invention.

FIG. 7 is a sequence diagram of two nodes performing a switchover in response to a VRRP status changing. The sequence diagram shows an example of the operations of FIG. 2 in a particular example. These operations include monitoring network interfaces and VRRP status, updating the parameter matrix to reflect changes, applying the changes as policy inputs, comparing matrices, and performing a switchover to a standby node. FIG. 7 has an active node 702 and a standby node 704 connected through a network, for example the network of FIG. 1 or any other suitable data communications network. The active node includes a High Availability (HA) module 712, a VRRP module 714, a routing module 716, and a system monitor 718. Similarly, the standby node 704 includes a HA module 722, a VRRP module 724, a routing module 726, and a system monitor 728. The modules may have dedicated physical hardware resources, dedicated virtual resources, or may exist as portions of larger systems. The sequence diagram shows only certain example signals to illustrate particular parts of the system operation. Many more signals may be sent and received before during and after the signals described herein.

At 730, the VRRP module 714 of the active node 702 sends VRRP advertisements 730 to the standby node 704 VRRP module 724. The first trigger in the sequence occurs when the system monitor 718 detects 731 that a network interface is down. In response, the active node 702 system monitor 718 detects this condition as a network interface status change at 731 and sends a notification 732 to the routing module 716, a notification 733 to the HA module 712 and a notification 734 to the VRRP module 714. The VRRP module responds by transitioning 735 the active node 702 to a VRRP backup status. It also attempts to send VRRP advertisements 736 to the VRRP module 724 of the standby node 704 after the transition 735 from VRRP master to VRRP backup. However, with the connectivity broken, the standby node 704 VRRP module 724 does not receive advertisements 736. The broken connectivity will be discovered by the system monitor 722, if not by the VRRP module 724. In response, the VRRP module 724 of the standby node 704 similarly transitions 737 the standby node 704 from VRRP backup to VRRP master.

In response to the state changes from VRRP master to backup at the active node 702, the VRRP module 714 notifies 739 the HA module 712 of the state change. The HA module 712 of the active node 702 updates 740 the active node 702 parameter matrix with the new VRRP status value. In this case, the value is reduced by one. The HA module 712 evaluates 741 the policies using the new value for VRRP status as input to the policies. At 742, the rules match and a switchover request signal 743 is sent to the standby node 704 with the active node 702 capability matrix.

In response to the state changes from VRRP backup to master at the standby node 704, the VRRP module 724 notifies 744 the HA module 722 of the state change. The HA module 722 of the standby node 704 updates 745 the standby node 704 parameter matrix with the new VRRP status value. In this case, the value is increased by one. The HA module 722 may then evaluate the policies and perform other operations not shown.

For a switchover, the HA module 712 of the active node 702, which is now a VRRP backup node, sends a switchover request signal 743 with a capability matrix to a suitable switchover candidate, in this case the illustrated HA module 722 of the standby node 704, which is now a VRRP master node. The HA module 722 of the standby node 704 receives the capability matrix and compares 746 the received capability matrix to the capability matrix of the standby node 704. If the standby node 704 capability matrix is better, then the standby node 704 HA module 722 sends a switchover acknowledgement 747 back to the active node 702 HA module 712. The active node 702 HA module 712 answers with an HA switchover signal 750 and also transitions 751 to a standby state. The standby node 704 HA module 722 upon receiving the switchover signal 750 transitions 752 to an active state. There may be a parameter matrix update operation (not shown) after the switchover operation is complete.

Figure 8:
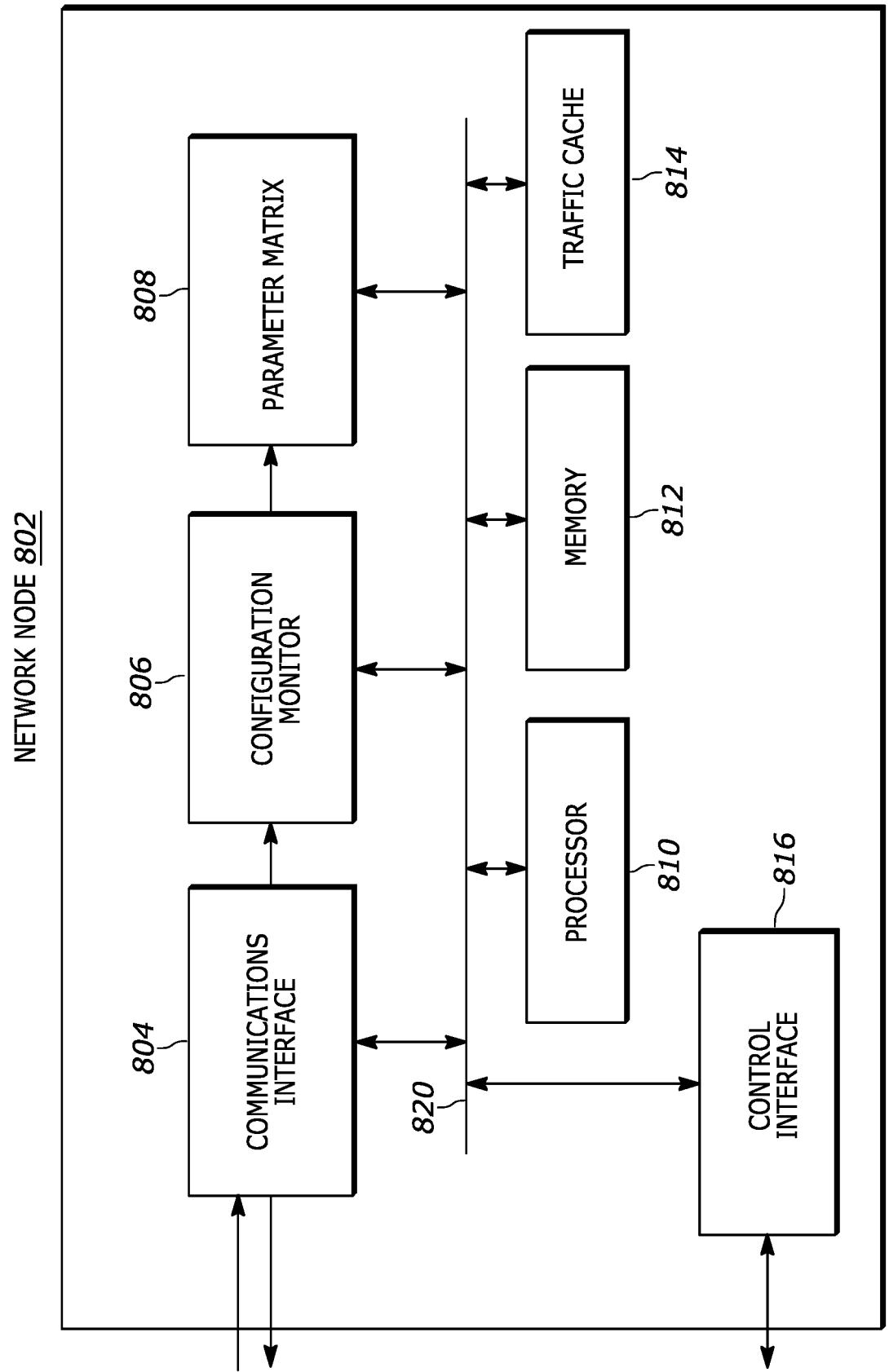
FIG. 8 is a block diagram of a network node according to embodiments of the invention.

FIG. 8 is a block diagram of a network node 802, which may be an active node, an inactive node or a remote or peer host, according to an embodiment herein. The node includes a processor 810, memory 812, and a communications interface 804 connected together through a bus 820. The processor 810 may include a multifunction processor and/or an application-specific processor. The memory 812 within the node may include, volatile and non-volatile memory for example, a non-transitory storage medium such as read only memory (ROM), flash memory, RAM, and a large capacity permanent storage device such as a hard disk drive. The communications interface 804 enables data communications with high availability as described above via local and wide area connections using one or more different protocols including BGP and VRRP. The node executes computer readable instructions stored in the storage medium to implement various tasks as described above. The node 802 further includes a traffic cache module 814 coupled to the bus 820 with various caches (e.g., application cache, domain application cache, client route cache, and application route cache) to store mapping information and other traffic communication data.

The node 802 further includes a configuration monitor 806 to monitor policy input as described above including BGP/OSPF updates, VRRP state updates, network interface state updates, and remote monitor updates, among others. The configuration monitor 806 generates alerts or interrupts and updates a parameter matrix 808 when there are changes to any of the monitored policy inputs. The processor 810 may alternatively be configured to update the parameter matrix as well as apply policies to the updates, compare matrices, and generate switchover requests, acknowledgements, and negative acknowledgments, among other tasks.

A control interface 816 may be provided for node management and configuration purposes as an interface to a computer monitor or flat panel display but may include any output device. In addition, the control interface 816 may include an interface to a computer keyboard and/or pointing device such as a computer mouse, computer track pad, touch screen, or the like, that allows a user to provide inputs and receive outputs including a GUI (graphical user interface). A GUI can be responsive of user inputs and typically displays images and data. The control interface 816 can be provided as a web page served via a communication to a remote device for display to a user and for receiving inputs from the user. Additionally, each of the modules may be implemented through computer-readable instructions that are executed on a physical processor of a computing system that supports the node The embodiments disclosed herein can be implemented through at least one software program running on at least one hardware device and performing network management functions to control the network elements. The network elements shown in FIG. 1 include blocks which can be at least one of a hardware device, or a combination of hardware device and software module. It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

In an embodiment, the functionality described above is performed by a computer device that executes computer readable instructions (software). Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method comprising:
    monitoring a plurality of network routing parameters that are available to an active network node;
    detecting a change of one of the plurality of network routing parameters;
    updating a parameter matrix of network routing parameters in response to the detected change, the parameter matrix comprising counts of the network routing parameters;
    applying the count of the changed network routing parameter to a policy in response to updating the parameter matrix; and
    sending a switchover request to a standby network node when the policy is met by the count of the changed network routing parameter.

2. The method of claim 1, further comprising generating an interrupt at a system monitor of the active node and sending the interrupt to a high availability module of the active node when the change in a network routing parameter is detected and wherein applying the count of the changed network routing parameter to the policy is performed by the high availability module.

3. The method of claim 1, further comprising:
    applying counts of the network routing parameters of the standby network node to a policy at the network standby node; and
    sending a switchover request acknowledgment to the active network node from the standby network node when the standby network node policy is not met by the standby network node network routing parameters.

4. The method of claim 1, further comprising sending a portion of the parameter matrix as a capability matrix to the standby network node for comparison with a capability matrix of the standby node, the capability matrix comprising a portion of the counts of the network routing parameters.

5. The method of claim 4, wherein the switchover request is rejected by the standby network node based on the comparison.

6. The method of claim 4, wherein the comparison further comprises comparing network capabilities of the active network node to the capabilities of the standby network node.

7. The method of claim 4, further comprising:
    applying counts of the network routing parameters of the standby network node to a policy at the network standby node; and
    sending a switchover request acknowledgment to the active network node from the standby network node when the standby network node policy is not met by the counts of the standby network node network routing parameters and based on the comparison.

8. The method of claim 1, wherein applying comprises applying a count of the changed network routing parameter to a rule with a comparison operator to determine if the comparison is met.

9. The method of claim 1, wherein applying comprises applying a plurality of counts of the parameter matrix to a sequence of rules having comparison operators.

10. The method of claim 9, wherein the rules of the sequence are conditional upon meeting a preceding rule of the sequence.

11. The method of claim 1, wherein the plurality of network routing parameters comprises a status of the active network node as a VRRP (Virtual Router Redundancy Protocol) master or backup node and wherein detecting a change comprises detecting when the status of the active network node changes.

12. The method of claim 1, wherein the plurality of network routing parameters comprises availability of a connected routing peer.

13. The method of claim 12, wherein monitoring the availability of the connected routing peer comprises sending a ping to the connected routing peer.

14. The method of claim 12, wherein the connected routing peer comprises a next hop border gateway protocol neighbor router.

15. A non-transitory computer-readable storage medium containing program instructions, wherein execution of the program instructions by the computer causes the computer to perform operations comprising:

monitoring a plurality of network routing parameters that are available to an active network node;

detecting a change of one of the plurality of network routing parameters;

updating a parameter matrix of network routing parameters in response to the detected change, the parameter matrix comprising counts of the network routing parameters;

applying the count of the changed network routing parameter to a policy in response to updating the parameter matrix; and sending a switchover request to a standby network node when the policy is met by the count of the changed network routing parameter.

16. The medium of claim 15, wherein applying comprises applying a count of the changed network routing parameter to a rule with a comparison operator to determine if the comparison is met.

17. The medium of claim 15, wherein applying comprises applying a plurality of counts of the parameter matrix to a sequence of rules having comparison operators.

18. An active network node comprising:
a processor; and
a non-transitory computer-readable storage medium, the non-transitory computer-readable storage medium including a parameter matrix of network routing parameters comprising counts of the network routing parameters, the non-transitory computer-readable storage medium further including instructions for:

a system monitor configured to monitor a plurality of network routing parameters that are available to the active network node and to detect a change of one of the plurality of network routing parameters; and a high availability module configured to update a parameter matrix of network routing parameters in response to the detected change, to apply the count of the changed network routing parameter to a policy in response to updating the parameter matrix, and to send a switchover request to a standby network node when the policy is met by the count of the changed network routing parameter.

19. The active network node of claim 18, wherein the system monitor further generates an interrupt and sends the interrupt to the high availability module when the change in a network routing parameter is detected.

20. The active network node of claim 18, wherein the high availability node further sends a portion of the parameter matrix as a capability matrix to the standby network node for comparison with a capability matrix of the standby node, the capability matrix comprising a portion of the counts of the network routing parameters.

* * * * *